UNITED STATES PATENT OFFICE.

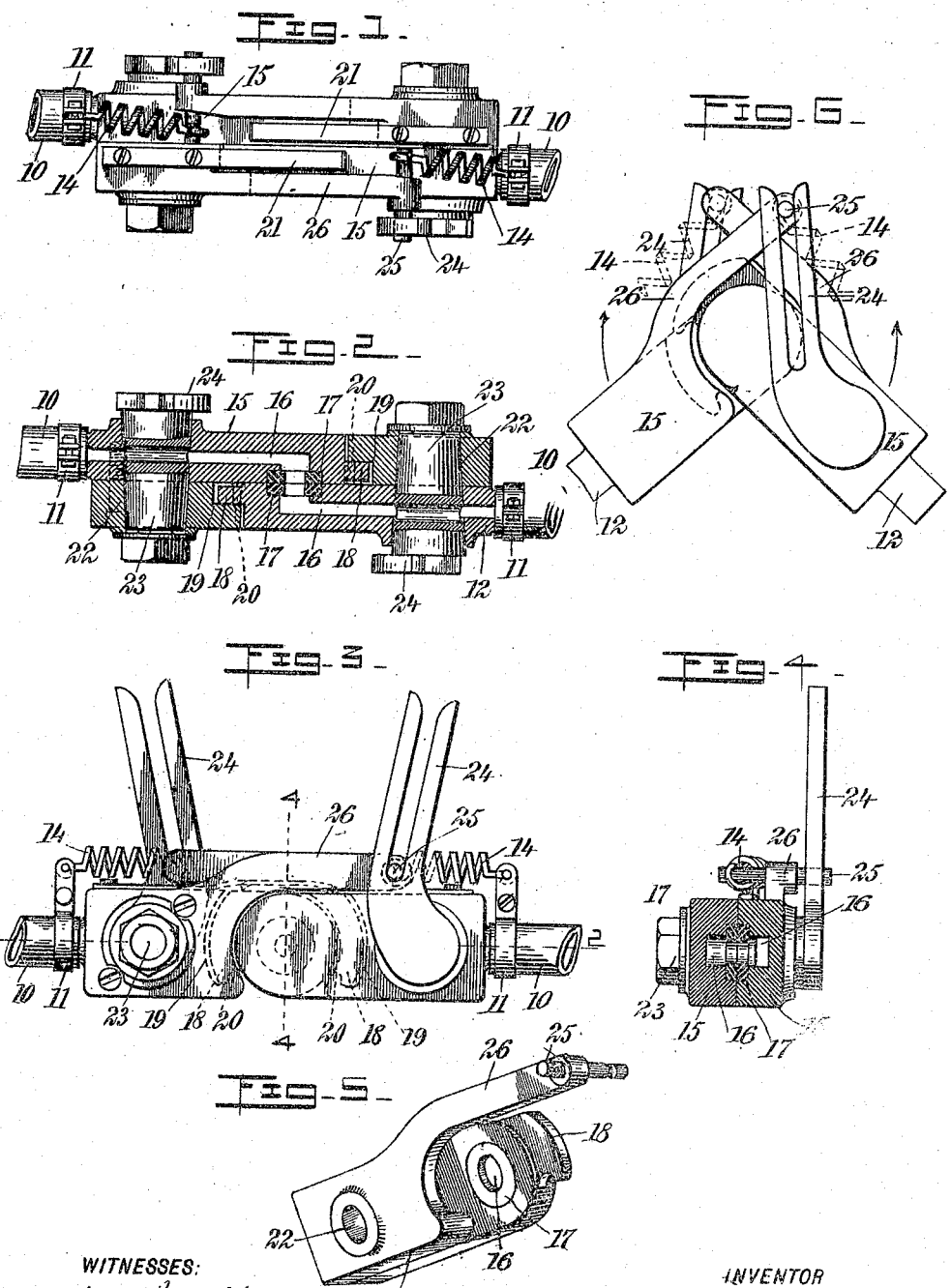

WILLIAM SKERMAN, OF BRISBANE, QUEENSLAND, AUSTRALIA, ASSIGNOR TO THOMAS CHIRGWIN LADNER AND NICOLAUS JOSEPH KESSELS, OF BRISBANE, AUSTRALIA.

HOSE-COUPLING.

No. 881,830.   Specification of Letters Patent.   Patented March 10, 1908.

Application filed May 19, 1904, Serial No. 208,708. Renewed May 6, 1907. Serial No. 372,031.

*To all whom it may concern:*

Be it known that I, WILLIAM SKERMAN, a subject of the King of Great Britain, and a resident of Brisbane, Queensland, Australia, have invented a new and Improved Hose-Coupling, of which the following is a full, clear, and exact description.

This invention relates to a coupling for hose sections or other fluid conductors, and it is useful in any instance involving a sectional fluid conductor, notably, in railway air brakes, and in the compressed air connections of rock drilling and analogous machines.

The invention comprises not only means for effecting a releasable hermetic connection between the hose sections, but also a novel means of automatically opening and closing the hose sections as they are connected or disconnected.

I will give below a description in specific terms of one example of my invention.

Reference is to be had to the accompanying drawings forming a part of this specification, in which similar characters of reference indicate corresponding parts in all the views.

Figure 1 is a plan view of the coupling with its parts engaged; Fig. 2 is a section on the line 2—2 of Fig. 3; Fig. 3 is a side elevation of the coupling with its parts engaged; Fig. 4 is a section on the line 4—4 of Fig. 3; Fig. 5 is a detail perspective view of one of the sections of the coupling; and Fig. 6 is a side elevation showing the parts in the act of connecting.

10 indicates the sections of the hose or other tubular fluid conductor in connection with which my invention may be applied. The hose sections are fastened by clips 11 to nipples 12 (see Fig. 6) formed on or secured to the respective sections of the coupling. To said clips 11, springs 14 are secured these springs extending inward and being suitably fastened to the pins 25, which will be hereinafter described.

The coupling sections are duplicates in construction, and each comprises a body 15 having therein a passage 16 communicating with the nipple 12. Said passages 16 open at the sides of the coupling sections, as shown in Fig. 2, so that when the sections are fitted together the passages will register to form a continuous fluid passage, and 17 indicates matching packing gaskets which are arranged one on each section to form a hermetic connection. The meeting end portions of the section bodies 15 overlap, as shown, and each section has an outwardly projecting hook 18, these hooks being arranged to be received in the cavities 19 formed in the respective sections, and to engage their bills with studs 20 formed at the lower portions of said cavities, as indicated by the broken lines in Figs. 2 and 3. In this manner the sections are removably connected together, and to hold them yieldingly in this position, each section carries a spring 21, these springs overlapping the opposite sections and causing the bills of the hooks 18 to be held firmly, yet yieldingly in engagement with the studs 20.

Crossing the passage 16 of each section 15 is a valve seat 22, and in said seats are arranged plugs or other forms of valves 23 controlling the fluid movement through the passages 16. To the said plugs 23 slotted arms 24 are secured, and within the slots of these arms are arranged respectively to play the pins 25 of arms 26 carried one on each coupling section, and the arm of one section being arranged to overlap the other section and to engage its pin with the slot of the arm 24 on said other section. When the sections are engaged, the arms 24 stand transversely to the sections as shown in Fig. 3, and when they are disengaged, the movement of the pins 25 through the slotted arms 24 will cause the arms 24 to approach parallelism with their coupling sections, thus imparting turning movement to the valves 23, and in this manner said valves may be made to open as the coupling sections are moved into engagement, and to close as the coupling sections are moved out of engagement. The arrows in Fig. 6 indicate the relative movement of the sections in the act of engaging together, by means of which movement the arms 24 are thrown outward from each other into the position shown in Fig. 3. To disengage the sections, a reversal of this movement is necessary.

The spiral springs 14 act yieldingly to hold the sections engaged and to resist any opening action. These springs 14 are secured at one end to the clips 11 and are provided with loops at their other ends which are slipped on and off the pins 25 by hand, as and when required. Previously to uncoupling the sections the springs 14 are slipped off the pins 25, and when coupling the sections the springs are stretched out and slipped on to the pins. Where the hose couplings are subject to forcible contact with any object, such as might happen when used in connection with rock drilling machines in mines, or for fire hose, the springs 14 serve as a safe guard against any accidental uncoupling.

Various changes in the form, proportions and minor details of my invention may be resorted to at will without departing from the spirit and scope thereof, hence I consider myself entitled to all such variations as may lie within the intent of my claims.

Having thus described my invention, I claim as new and desire to secure by Letters Patent,—

1. The combination of two coupling sections, hose sections respectively connected therewith, clips for joining the hose sections to the coupling sections, and springs connected to the clips and to the coupling sections.

2. The combination of two coupling sections, hose sections, means for connecting the hose sections to the coupling sections, and springs connected to said connecting means and to the coupling sections.

3. In a hose coupling, the combination of two coupling sections each having a passage therein, the said passages registering with each other when the sections are engaged, each coupling section having a hook member adapted to enter a cavity in the other section, the bills of the hooks engaging studs formed at the lower portions of said cavities to removably hold the sections together, each coupling section also having a longitudinally projecting arm extending beyond the hook member and adapted to overlap the other section, a valve mounted in each section and commanding the passage thereof, and an arm connected to each valve, the last named arm of one coupling section being adapted to engage a part of the first named arm of the other section, whereby automatically to operate the valve, and springs supported at one end and connected at the other end with the said longitudinally projected arms.

4. In a hose coupling, the combination of two coupling sections each having a passage therein, and the passages registering with each other when the sections are engaged, each coupling section having a hook member adapted to enter a cavity in the other section, the bills of the hooks engaging studs in said cavity to removably hold the sections together, each coupling section also having a longitudinally projected arm extending beyond the said hook member and adapted to overhang the other section, a valve mounted in each section and commanding the passage thereof, and an arm connected to each valve, the last named arm of one coupling section being adapted to engage a part of the first named arm of the other section whereby automatically to operate the valve, the second named arms being longitudinally slotted and the first named arms having laterally disposed pins at their ends received in the slots.

5. In a hose coupling, the combination of two coupling sections each having a passage therein, and the passages registering with each other when the sections are engaged for the purpose specified, and each coupling section also having a longitudinally projected arm adapted to overhang the other section, a valve mounted in each section and commanding the passage thereof, an arm connected to each valve, the last named arms of one coupling section being adapted to engage a part of the first named arm of the other section whereby automatically to operate the valve, clips adapted to connect the hose sections with the coupling sections, and springs connected to the clips and to the first named arms of the opposite coupling sections respectively.

6. In a hose coupling the combination of two coupling sections, a rocking valve commanding each section, an arm connected with each valve and swinging with the same to open and close the valve, a connection between each of said arms and the other coupling section to operate the valve upon the relative movement of the coupling sections, clips for connecting the hose sections with the coupling sections, and springs connected to the clips and to the coupling sections.

In testimony whereof I have signed my name to this specification in the presence of two subscribing witnesses.

WILLIAM SKERMAN.

Witnesses:
S. LYON,
R. E. A. SHORTER.